United States Patent [19]
Lisle et al.

[11] Patent Number: 6,069,630
[45] Date of Patent: *May 30, 2000

[54] DATA PROCESSING SYSTEM AND METHOD FOR CREATING A LINK MAP

[75] Inventors: Linda Arnold Lisle; Carl William Romero, both of Cedar Park, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/916,458

[22] Filed: Aug. 22, 1997

[51] Int. Cl.⁷ .................................................. G06F 3/14
[52] U.S. Cl. ........................ 345/357; 345/348; 345/355; 707/501
[58] Field of Search ...................... 345/355, 356, 345/357, 349, 326, 335, 339, 348; 707/501, 513

[56] References Cited

U.S. PATENT DOCUMENTS

| | | | |
|---|---|---|---|
| 5,021,972 | 6/1991 | Nishi | 364/518 |
| 5,109,274 | 4/1992 | Washio et al. | 358/80 |
| 5,113,356 | 5/1992 | Nickell et al. | 395/108 |
| 5,245,655 | 9/1993 | Buehn et al. | 380/18 |
| 5,261,040 | 11/1993 | Suzuki | 345/146 |
| 5,305,435 | 4/1994 | Bronson | 395/159 |
| 5,394,444 | 2/1995 | Silvey et al. | 375/374 |
| 5,528,735 | 6/1996 | Strasnick et al. | 345/357 |
| 5,559,942 | 9/1996 | Gough et al. | 345/349 |
| 5,566,294 | 10/1996 | Kojima et al. | 395/159 |
| 5,588,105 | 12/1996 | Foster et al. | 395/326 |
| 5,708,845 | 1/1998 | Wistendahl et al. | 707/513 |
| 5,715,432 | 2/1998 | Xu et al. | 345/356 |
| 5,786,820 | 7/1998 | Robertson | 345/357 |
| 5,808,613 | 9/1999 | Marrin et al. | 345/355 |
| 5,870,559 | 2/1999 | Leshem et al. | 395/200.54 |
| 5,877,766 | 3/1999 | Batos et al. | 345/357 |
| 5,892,507 | 4/1999 | Moorby et al. | 345/302 |
| 5,892,513 | 4/1999 | Fay | 345/356 |
| 5,926,180 | 7/1999 | Shimamura | 345/357 |
| 5,937,163 | 8/1999 | Lee et al. | 345/357 X |

OTHER PUBLICATIONS

PC Magazine, Web page editors make ground designs, Edward Mendelson, p. 1–12, Summer 1997.

Front page—MSDN Library, Microsoft Corp, Frontpage webs and the Microsoft Frontpage Explorer, 1–13, 1996.

*Primary Examiner*—Raymond J. Bayerl
*Assistant Examiner*—Chadwick A. Jackson
*Attorney, Agent, or Firm*—Winstead Sechrest & Minick P.C.; Volel Emile

[57] ABSTRACT

A data processing system and methodology implement a graphical user interface for providing a graphical link map. In the graphical link map, various types of files and documents are color-coded and shape-coded for easy identification of placement within a linked environment of a web page. The methodology for implementing the graphical link map manipulates dynamic, complex linked programs or files in a virtual three-dimensional graphical display in a web page authoring program. This graphical display allows linked programs to be built, edited, combined, by presenting the representation on a workspace. An external user may thus access the entire linked program on a single screen of a graphical user interface of the web page developer to easily identify and manipulate differing authoring elements within that data processing environment.

20 Claims, 4 Drawing Sheets

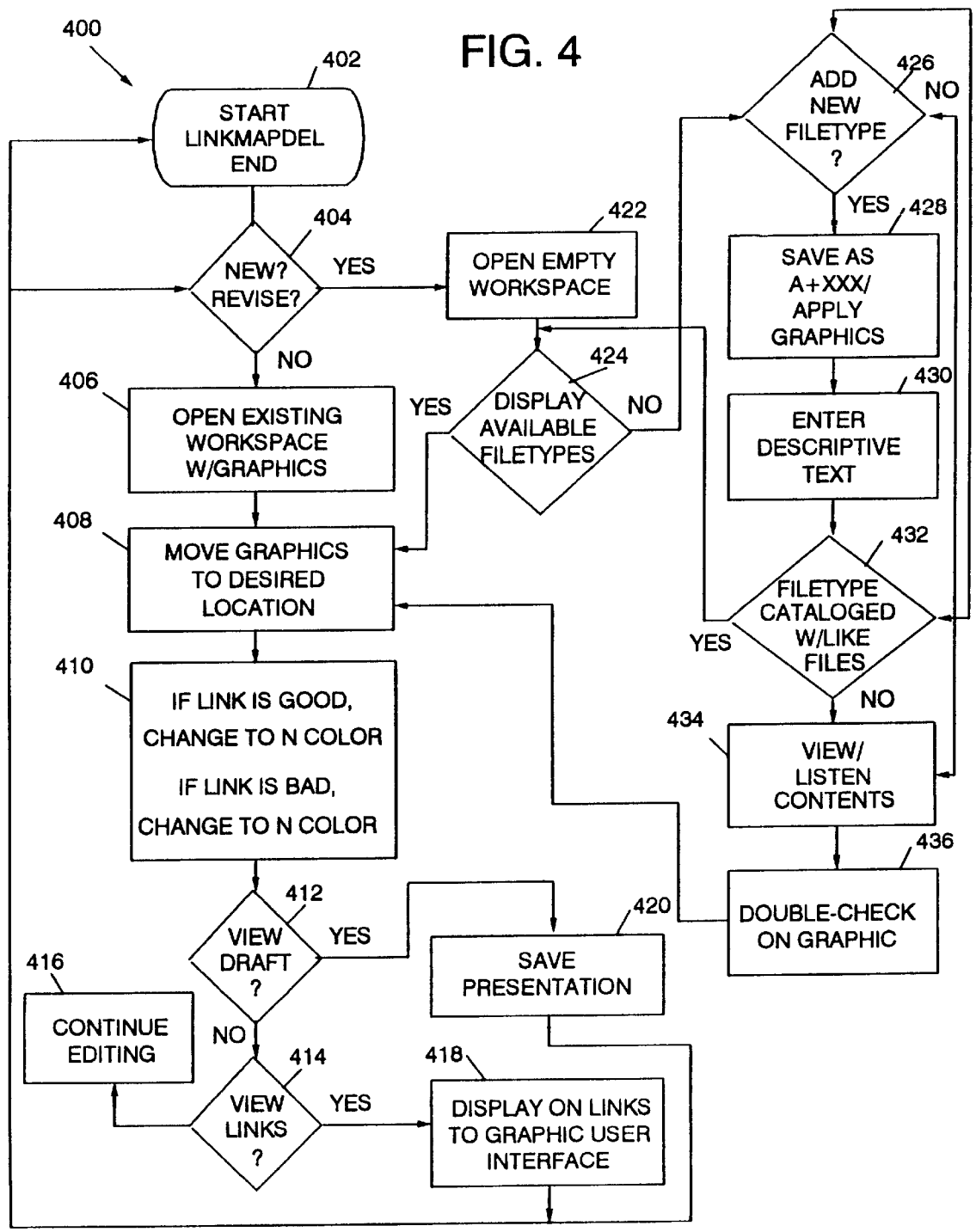

DATA PROCESSING SYSTEM AND METHOD FOR CREATING A LINK MAP

TECHNICAL FIELD

The present invention relates in general to a link within an Internet communication system, and in particular, to a graphical representation of the link to the internet location.

BACKGROUND INFORMATION

Data processing systems have evolved dramatically over the past several years. Chief among the abilities of current data processing systems is an ability to access and interface with a number of other data processing systems via a system of connections, commonly referred to as the Internet. As use of the Internet has become more common, the development of computer interfaces, commonly referred to as "web pages," has increased. When a web page is developed, the developer of the web page may desire to utilize files available on the Internet.

When available files on the Internet are accessed and used by web page developers, current development applications require the developer to save the information corresponding to an accessed web page to a local memory of the user. Thus, if a wide variety of web pages are desired to be used from other sources on the Internet, a significant amount of memory may be consumed in the local data processing system when the web page information is stored thereto.

Alternatively, some web page navigation tools implement the use of "bookmarks." Applications utilizing bookmarks include Netscape Communicator 4.0 and the Netscape Communicator Professional Edition 4.0, among others. During operation, an application which utilizes bookmarks identifies URL (Uniform Research Locator) strings for each of the resources desired to be accessed in the developed web page. The bookmarks are typically stored in a HTML (hypertext mark-up language) file located in a memory of the local data processing system implementing the bookmark. Subsequently, a bookmark menu may be provided to display these URL's by a document title or by the URL string itself, if the title is not available, to indicate the resources saved to a user's system. While bookmarks are useful tools, a developer of a web page must track and record a type of file which corresponds to the bookmark and remember the application associated with the URL string of the bookmark. Stated another way, a developer of a web page does not know a type of object available at the end of a bookmark simply because a bookmark exists.

In addition to bookmarks, some web navigators implement the use of "links." When links are utilized, URL's corresponding to search results are saved in a similar manner as a bookmark. Thus, links and bookmarks may be used within current graphical user interfaces to allow a user to access a URL corresponding to a desired application on the Internet, but do not allow the use to access the object corresponding to the URL. Note that both the bookmark and the link functions require a user to know a URL.

When links and bookmarks are utilized to develop a web page, some development tools utilize site maps to implement a hierarchial template for developing the web page. In such site maps, relationships between web pages are graphically illustrated to a user. Therefore, by using a site map, the web pages which may be accessed from a web page are graphically illustrated to the web page developer.

Each of the aforementioned methodologies for developing a web page requires a developer to determine a URL before the contents of the web page associated with the URL may be accessed. Additionally, the developer must know the object associated with the URL accessed by their developed web page. Therefore, a need exists for a methodology and data processing system that allows a user to easily determine a type of file that is to be accessed by a web page the user is developing, without actually accessing the file or determining the URL associated with the web page.

SUMMARY OF THE INVENTION

The previously mentioned needs are fulfilled with the present invention. Accordingly, there is provided, in a first form, a data processing system. The data processing system includes a central processing unit for accessing a first address corresponding to a first application from a network and for generating a first plurality of control signals in response to the first address. The data processing system also includes a display circuit connected to the central processing unit for receiving the first plurality of control signals. The display circuits generates a first graphical display representing the first application in the network.

Additionally, there is provided, in a second form, a method for operating a data processing system. The method includes the steps of accessing a first application in a communication network and assigning a first graphical display to correspond to the first application. The first graphical display indicates a filetype of the first application.

Furthermore, there is provided, in a third form, a program storage device readable by a machine, tangibly embodying a program of instructions executable by the machine to perform method steps for developing a communication interface for a data processing system. The method steps include accessing a first application in a communication network and assigning a first graphical display to correspond to the first application. The first graphical display indicates a filetype of the first application.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates, in flow diagram form, a methodology implemented in one embodiment of the present invention.

DETAILED DESCRIPTION

Figure 1:
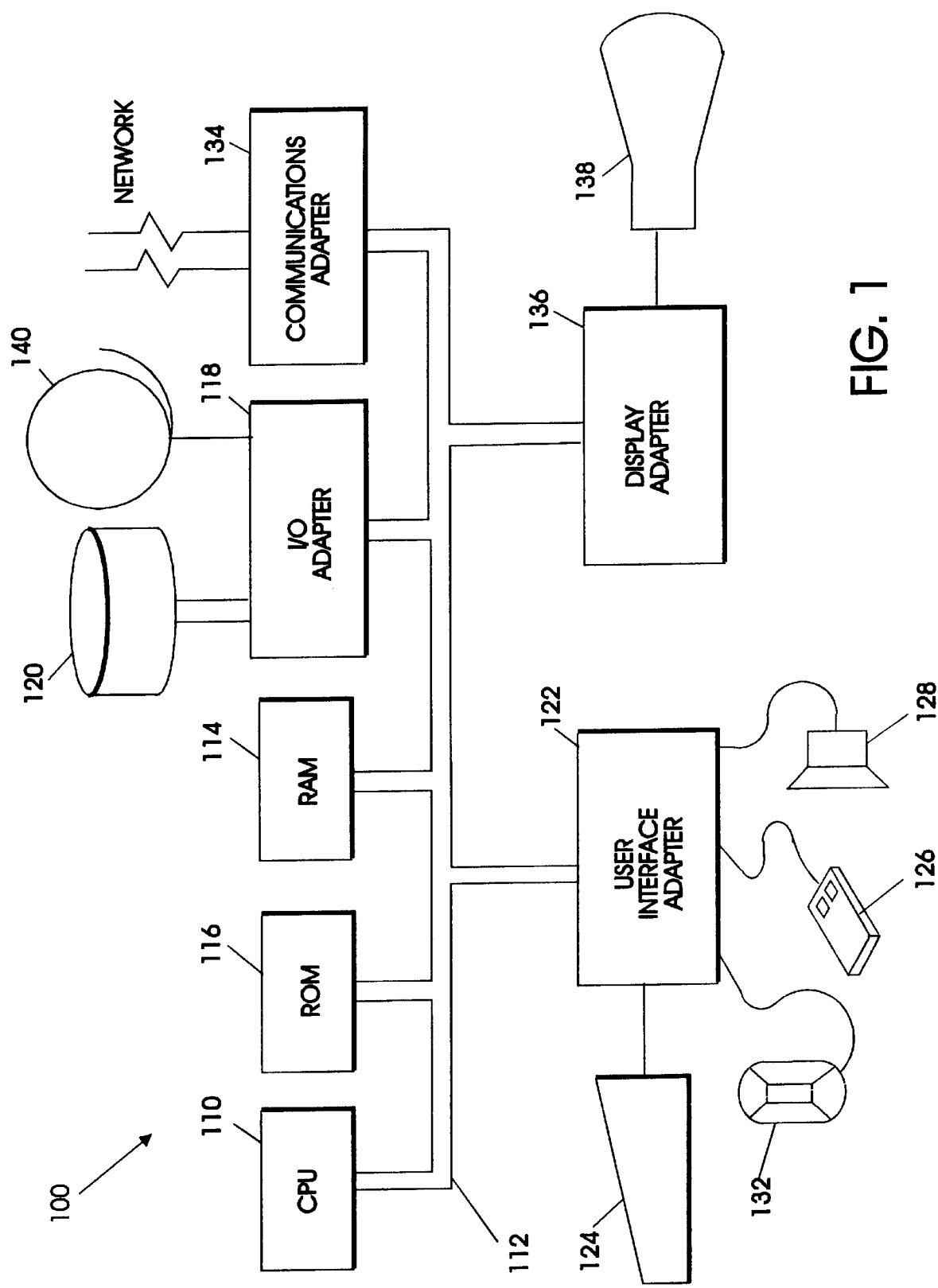
FIG. 1 illustrates, in block diagram form, a data processing system in accordance with one embodiment of the present invention.

The data processing system and methodology of the present invention implement a graphical user interface for providing a graphical link map. In the graphical link map, various types of files and documents are color-coded and shape-coded for easy identification and placement within a linked environment of a web page. The methodology implemented by the present invention manipulates dynamic, complex linked programs or files in a virtual graphical display of a web page developer or builder. This graphical display allows linked programs to be built, edited, and combined by presenting an entire linked program on a workspace. The user may thus access the entire linked program on a single screen of a graphical user interface of the web page to allow the developer to easily identify and manipulate differing authoring elements within that data processing environment. The data processing system and method which implement each of the functions described above will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

During operation of the data processing system 100 of FIG. 1, assume that a web page developer is designing a web page that may be accessed by others within a network connected by communications adapter 134. It should be noted that in the following discussion, "objects" may be defined as a representation of a file type, including a three-dimensional representation, that is defined by the web page developer. Additionally, "objects" may be defined as any type of file that can be used in an authoring environment. Such files may include sound, movie, HTML, and printable files, among others.

Figure 2:
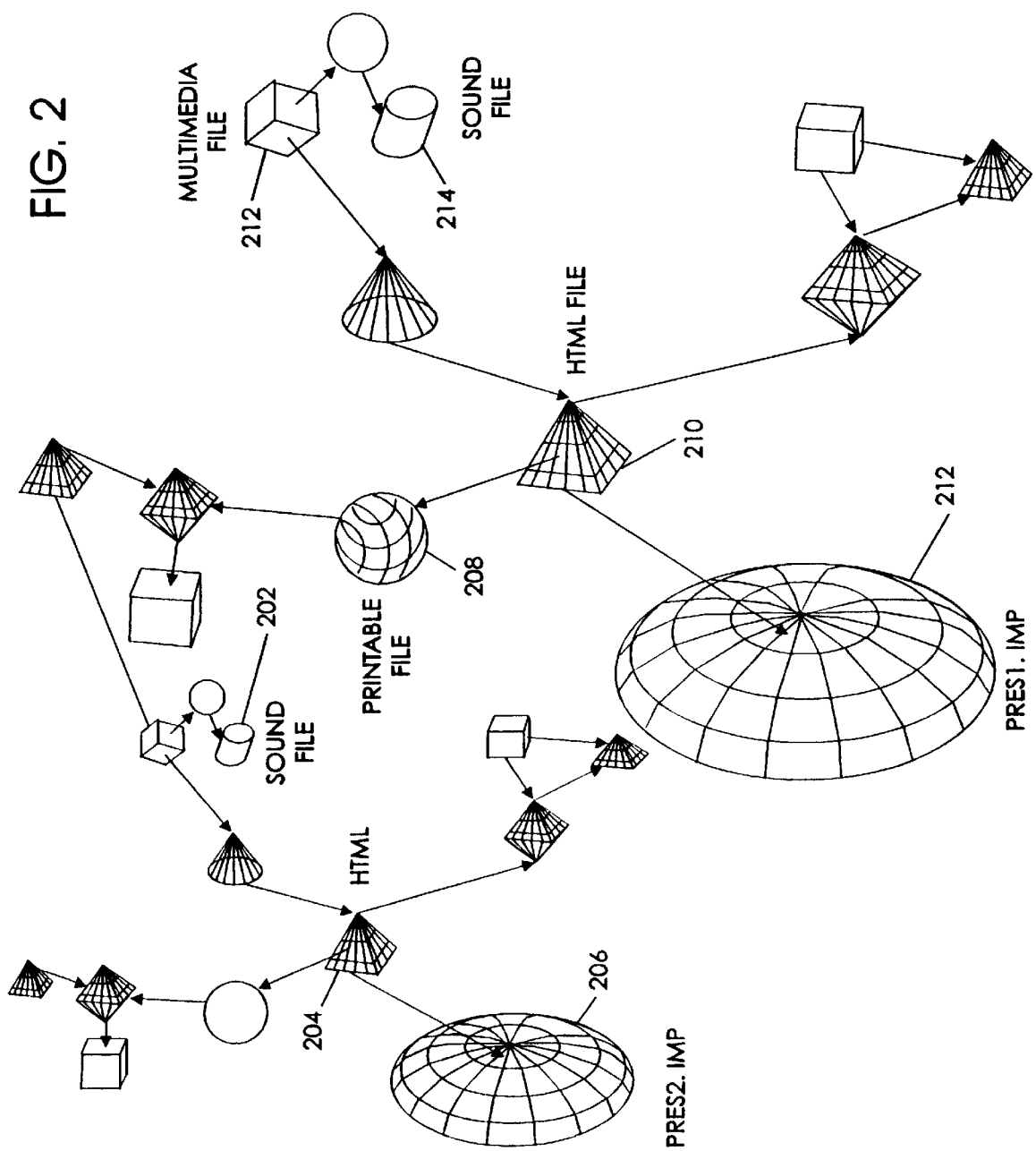
FIG. 2 illustrates, in block diagram form, a graphical user interface implemented in accordance with one embodiment of the present invention.

As previously mentioned, the methodology and data processing described herein is implemented by a web page developer to manipulate dynamic, complex linked programs or files in a graphical display such as that illustrated in FIG. 2. In one embodiment of the present invention illustrated in FIG. 2, the graphical display is a virtual three-dimensional graphical display. Such a graphical display will simplify the process required to build, edit, or combine linked programs during a web page development process on display device 138. Thus, as is illustrated in FIG. 2, the lines found in a web page are illustrated on display device 138. For example, in FIG. 2, a user may access an application on a remote data processing system via communications adapter 134. In accessing that application, a URL and object associated with the application are retrieved in accordance with well-known data processing steps. These data processing steps are analogous to those used for the creation of "bookmarks" and "links" and, therefore, will not be described in greater detail herein. As illustrated in FIG. 2, each application is assigned a graphic representation. FIG. 2 illustrates such graphic representations as being three-dimensional, the purposes of which will subsequently be explained in greater detail. It should be noted that pyramid 204 indicates that the object is an HTML file, while cylinder 202 indicates that the program is linked to a sound file. Additionally, saucer 206 is associated with any link map application, sphere 208 is associated with a printable file, and cube 212 is associated with a multimedia file. Furthermore, as illustrated in FIG. 2, links between each of the applications may be easily illustrated on display device 138 when such graphics are utilized to represent the applications. Therefore, rather than requiring a user to input a URL associated with each of the applications or to store the applications in a memory location internal to data processing system 100, these graphic representations of the applications allow a user to easily manipulate and connect the applications in a visual manner that is easy to understand.

In addition to simplifying a graphical display during the web page development process, the methodology and data processing system of the present invention may identify objects and catalog the objects with a unique identifier, such as a computer-generated number. Furthermore, as previously mentioned, the data processing system and methodology of the present invention may implement a graphic corresponding to the object to allow for easy visual identification of a particular type of file. For example, in one embodiment of the present invention, a sound file might be identifiable with a green cylinder (202), while a printable file may be identified with a blue sphere (208). It should be noted that other graphics, whether three-dimensional or two-dimensional, may also be used. By associating objects with graphical displays, the present invention enables users to link together graphical representations of elaborate inter-dependent presentations that are presented in a virtual space that can be rotated and manipulated by the author. Furthermore, the data processing and method implemented by the present invention may utilize files types that have been stored locally on a disk drive, objects on the Internet, or objects stored in a database, such as may be stored on disk storage device 120.

Figure 3:
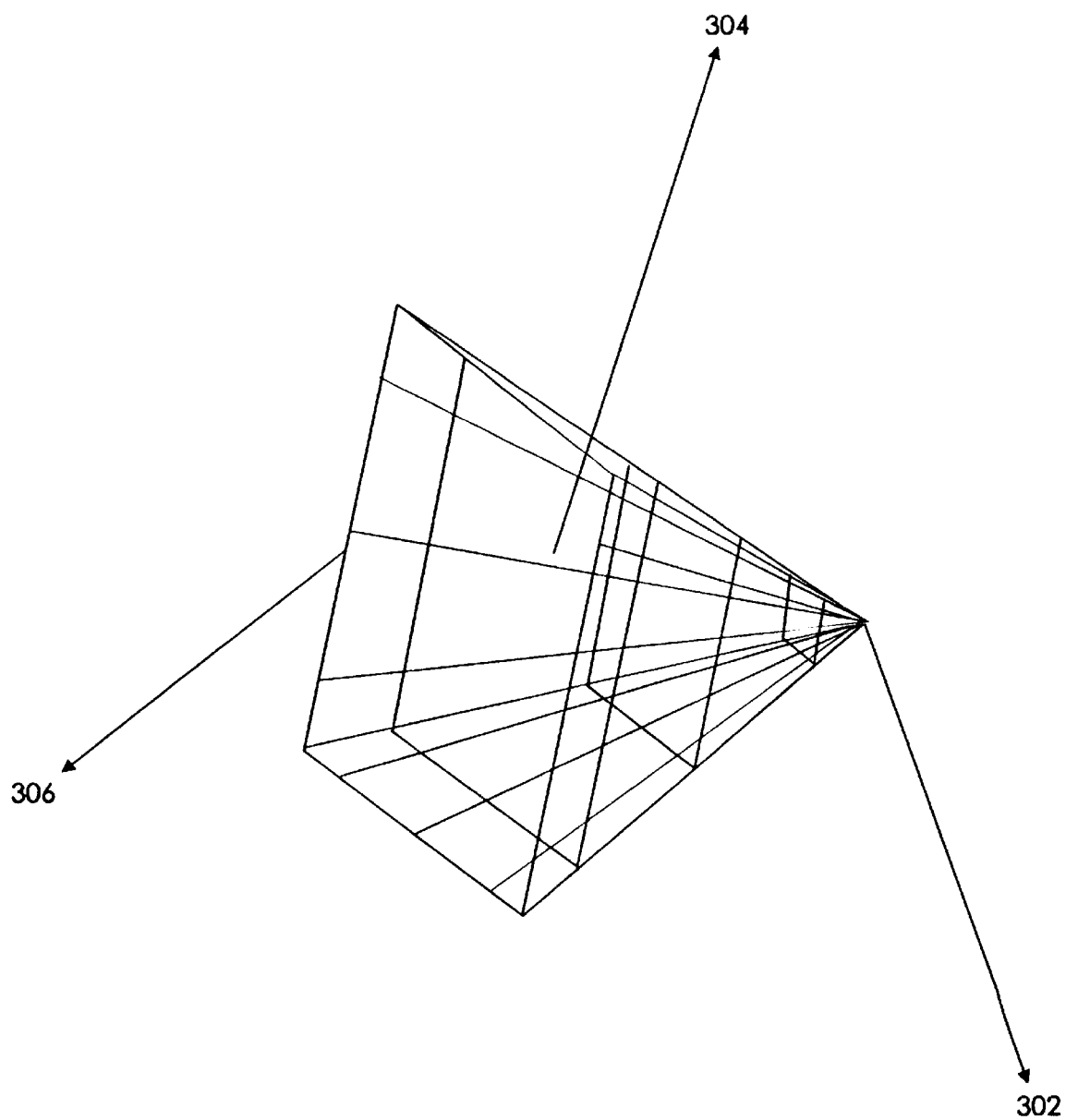
FIG. 3 illustrates, in block diagram form, a file representation in accordance with one embodiment of the present invention.

Refer now to FIG. 3, each graphical representation developed by the data processing system and methodology of the present invention may be linked at the top (302), middle (304), or bottom (306). To state this linking operation logically, when put together, the graphic representations of the present invention represent a file, wherein files have a beginning, middle and an end. Thus, in FIG. 3, when a web page developer enables a link to the top of an object, a logical link is pointing to a top of a web page or beginning of an application. Similarly, when the developer links to the middle of the object, the developer is linking to a location within the middle of the object to which the link is being made. A link to the middle of an object indicates that only a portion of the contents are to be used in the presentation. Furthermore, a link that starts at the top of an object and is linked to the bottom of another object indicates that all of the contents of the object are to be used in the presentation.

When objects are linked together, the web page developer receives feedback from a program as to whether the link is acceptable. For example, when using the methodology of the present invention, an unacceptable link may be identified in a red color, may blink, or may be otherwise denoted as being an unacceptable. When the linking operation is complete, the web page developer may then run the program to determine how the presentation is made.

During operation of the methodology of the present invention, the methodology allows a user to enter descriptive text about an object to be saved into the web page development program. Thus, when the web page developer or the user of a finished web page accesses the graphic display representing the object, the descriptive text will be displayed to the user via display device 138. For example, when a user uses mouse 126 to access the graphical display, the descriptive text will be displayed to the user. Additionally, users are able to identify the graphical object by double-clicking on the graphic in the workspace. The data processing system and methodology of the present invention will then open the file and display the contents, or perform an action such as playing a sound in an appropriate manner.

During development of the web page, the data processing system and methodology of the present invention allows objects to be manipulated through the use of "dragging and dropping" operations to form a link map. During operation of the methodology of the present invention, the web page developer may "drag" the desired objects onto a work area and then begin to link them together by clicking on the area of the graphical display where the link should be placed. A user is then able to view the graphical display with all related links in a link map to ease the difficulties associated with developing a web page.

While the foregoing has provided a description of the functionality implemented by the present invention, a data processing system and method for implementing each of the functions described above will subsequently be described in greater detail.

Refer now to FIG. 4. FIG. 4 illustrates a methodology implemented by data processing system 100 to implement one embodiment of the present invention. In a step 402, a methodology of the present invention, herein referred to as "link mapper," is initiated. Subsequently, in a step 404, CPU 110 of data processing system 100 determines whether a web page developer desires to design a new web page or revise an existing web page via an input received to user interface adapter 122 via one of the plurality of user input devices 124–132. If a new web page is being developed or an existing web page is being revised, step 422 is executed. When executing step 422, CPU 110 opens an "empty" workspace. CPU 110 performs this function by accessing a predetermined memory location within RAM 114, in one embodiment of the present invention. However, if a new web page is not being developed and an existing web page is not being revised, an existing workspace is opened to display the graphics associated therewith in step 406.

Next, in step 424, CPU 110 determines whether available filetypes should be displayed when a web page is new or should be revised. If a web page has not previously been developed, then a new object should be designated and the program flow goes to step 426. In step 426, CPU 110 determines whether a new object should be added to the display of available objects. If yes, the workspace is saved in a file stored in a memory location corresponding to an appropriate computer generated number in a step 428. Additionally, in step 428, CPU 110 associates a graphic with the new object. This graphic may be input to user interface adapter 122 via one of the plurality of user interface devices 124–132 or may be a default by CPU 110. Subsequently, in step 430, CPU 110 enables user interface adapter 122 to receive descriptive text input via one of the plurality of user interface devices 124–132. The descriptive text is provided by user interface adapter 122 to CPU 110, where it is associated with the new object, using well-known techniques.

Subsequently, in step 432, CPU 110 determines whether the object should be cataloged with like files. If yes, a program flow returns to step 424 and the new object, its associated graphics and descriptive text, are displayed with the other available objects. However, if the objects should not be cataloged with like files, a program flow returns to step 426, where it is determined whether a new object should be added to the web page. If a new object should not be added to the web page in step 426, a program flow returns to step 434, where CPU 110 determines whether an external user desires to view or listen to the contents of the object displayed on the web page. The use of CPU 110 to determine whether the content of the object should be viewed or listened to is well-known in the data processing art and, therefore, will not be described in greater detail herein.

When the user does not want to view or listen to the contents in step 434, a program flow returns to step 426 to determine if a new object should be added. If a new object should not be added, the user may then close the program through a save and exit operation and return to an initial step of the program flow.

If the external user does desire to view or listen to the contents of the object in the workspace, the user may then access the object by passing a cursor controlled by mouse 126 over the graphic or by double-clicking mouse 126 on the graphic in a step 436. At this point, a program flow goes to step 408.

Assume now that a new web page or revised web page is not desired by an external user in step 404. If the user does not desire to revise an existing document or workspace, a default of the program of one embodiment to the present invention automatically creates a new workspace. It should be noted that in the alternative, the program could be exited upon the user indicating that they do not desire to modify the existing workspace. When a user desires to open an existing workspace, a program flow goes to step 406, wherein CPU 110 provides control and data signals to open an existing workspace with graphics displayed thereon. The graphics are subsequently displayed on display device 138 through the use of display adapter 136 and under control of CPU 110. After the workspace has been opened, graphics are moved to a desired location within the workspace in a step 408. As was previously described, the graphics are moved using "drag and drop" operations in which a cursor is positioned over the graphic on display device 138, and control is provided via mouse 126 to indicate that the graphic is desired to be moved to a different position within the existing workspace.

If the link is acceptable when moved in step 408, CPU 110 modified a color, shape, or configuration of the graphic corresponding to the link. Similarly, in one embodiment of the present invention, if the link formed by the moved graphic is unacceptable, the graphic corresponding to the link may be modified through changing to another color, shape, or configuration in a step 410.

Next, in step 412, CPU 110 determines whether the developer desires to view the results of linking two or more objects. If a new draft is desired to be viewed by the developer, CPU 110 saves the resulting presentation in a step 420 and provides the appropriate control signals to view linked objects. Subsequently, a program flow returns to steps 402 and 404.

However, if an external user does not desire to view the resulting draft of the web page, step 416 is executed to enable CPU 110 to be used to perform continuing editing processes. This editing continues until a user desires to view a draft of the web page in step 412. Subsequently, if a user desires to view the links associated with the web page in step 414, CPU 110 controls and data signals to display all links to display device 138 in a step 418. A program flow subsequently returns to steps 402 and 404.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A data processing system for web page authoring comprising:

circuitry operable for displaying a plurality of graphics wherein each graphic represents a file in authoring said web page;

circuitry operable for displaying links between graphics; and circuitry operable for generating each of said links, wherein each link is operable for connecting to one of said top, middle, and bottom of a graphic, and wherein a connection to said top represents a logical link to a location at the beginning of file, a connection to a middle represents a logical link to a location within a middle of said file, and a link to said bottom indicates that all contents of said file are used in said web page.

2. The data processing system of claim 1 wherein each graphic corresponds to one of a plurality of filetypes in an authoring environment.

3. The data processing system of claim 1 wherein each of said plurality of graphics is a three-dimensional graphic.

4. The data processing system of claim 1 wherein each of said plurality of graphics is operable for displaying contents of a corresponding file in response to user input.

5. The data processing system of claim 1 further comprising circuitry operable for displaying each link in a first color if said link is good, and in a second color if said link is bad.

6. The data processing system of claim 1 further comprising:

circuitry operable for entry of descriptive text associated with each of said files; and circuitry operable for saving said descriptive text in a web page authoring program.

7. A method of generating a link map comprising the steps of:

displaying a plurality of graphics wherein each graphic represents a file in authoring said web page;

displaying links between graphics; and generating each of said links, wherein each link is operable for connecting to one of a top, middle, and bottom of each graphic, and wherein a connection to said top represents a logical link to a location at the beginning of a file, a connection to a middle represents a logical link to a location within a middle of said file, and a link to said bottom indicates that all contents of said file are used in said web page.

8. The method of claim 7 wherein each graphic corresponds to one of a plurality of filetypes in an authoring environment.

9. The method of claim 7 wherein each of said plurality of graphics is a three-dimensional graphic.

10. The method of claim 8 further comprising the step of displaying said plurality of filetypes available in an authoring environment.

11. The method of claim 7 further comprising the step of associating descriptive text with at least one of said plurality of graphics.

12. The method of claim 7 further comprising the step of changing a color of at least one of said links from a first color to a second color when said at least one link is bad.

13. The method of claim 7 further comprising the step of outputting contents of a file selected in response to user input.

14. A program storage device readable by machine, tangibly embodying a program of instructions executable by the machine to perform method steps for developing a communication interface for a data processing system, comprising the steps of:

displaying a plurality of graphics wherein each graphic represents a file in authoring said web page;

displaying links between objects; and generating each of said links, wherein each link is operable for connecting to one of a top, middle, and bottom of each graphic, and wherein a connection to said top represents a logical link to a location at the beginning of a file, a connection to a middle represents a logical link to a location within a middle of said file, and a link to said bottom indicates that all contents of said file are used in said web page.

15. The program storage device of claim 14 wherein each graphic corresponds to one of a plurality of filetypes in an authoring environment.

16. The program storage device of claim 14 wherein each of said plurality of graphics is a three-dimensional graphic.

17. The program storage device of claim 15 wherein said method steps further comprise the step of displaying said plurality of filetypes available in an authoring environment.

18. The program product of claim 14 wherein said method steps further comprise the step of associating descriptive text with at least one of said plurality of graphics.

19. The program product of claim 14 wherein said method steps further comprise the step of changing a color of at least one of said links from a first color to a second color when said at least one link is bad.

20. The program product of claim 14 wherein said method steps further comprise the step of outputting contents of a file selected in response to user input.

* * * * *